United States Patent [19]
Plakosh et al.

[11] Patent Number: 5,657,431
[45] Date of Patent: Aug. 12, 1997

[54] IMAGE ROTATION FROM VIRTUAL MEMORY IN A DIGITAL PRINTING SYSTEM

[75] Inventors: David Plakosh, Rochester, N.Y.; Juan A. Romano, North Hills, Calif.; Frederic J. Stann, Moorpark, Calif.; Guillermo Lao, Torrance, Calif.

[73] Assignee: Xerox Corporation, Stamford, Conn.

[21] Appl. No.: 657,130

[22] Filed: Jun. 3, 1996

[51] Int. Cl.$^6$ .................................................. G06K 15/00
[52] U.S. Cl. .......................................... 395/115; 395/117
[58] Field of Search .................................. 395/112, 115, 395/116, 117, 137, 507, 508, 509, 510, 511, 515, 516, 517, 520, 521, 523, 524, 525; 382/296, 297

[56] References Cited

U.S. PATENT DOCUMENTS

| | | | |
|---|---|---|---|
| 4,307,958 | 12/1981 | McIrvine | 355/23 |
| 4,453,841 | 6/1984 | Bobick et al. | 400/126 |
| 4,935,897 | 6/1990 | Kurihara et al. | 395/115 |
| 5,012,434 | 4/1991 | Zietlow et al. | 395/117 |

*Primary Examiner*—Arthur G. Evans
*Attorney, Agent, or Firm*—R. Hutter

[57] ABSTRACT

In a high-speed digital printing apparatus having duplex capability, second-side images must be rotated. In order to quickly rotate the second-side images, the image data for the images are read out from memory in a reverse order of addresses, with each address corresponding to one byte. As each byte is transferred to an imager, a relationship of sets of bits, each set of bits corresponding to one pixel, are altered within each byte.

2 Claims, 3 Drawing Sheets

IMAGE ROTATION FROM VIRTUAL MEMORY IN A DIGITAL PRINTING SYSTEM

BACKGROUND OF THE INVENTION

The present invention relates to retrieving uncompressed image data from a memory for application to printing hardware, wherein a desired rotation of the image to be printed is implemented by a specific data-retrieval technique.

In computer science, high speed digital printing presents unique requirements to data-processing equipment. To operate a printing apparatus which is designed to output over 100 page-size images per minute, the ability to make the desired image data available to printing hardware requires very close tolerances in the management of the "overhead" when data is transferred from memory to printing hardware. A typical 600 spi letter-size page image, in a format suitable to be submitted to printing hardware, is typically of a size of about 4 MB; when the printing hardware demands the image data to print the particular page, this 4 MB of image data must be accessed from real memory within a time frame of approximately 300 milliseconds.

In the high-speed printing context, wherein large quantities of image data must be accessed in real time for immediate application to printing hardware such as a modulating laser or an ink-jet printhead, a preferred technique for accessing a specifically-required quantity of image data for printing a particular sheet at a particular time is known as "direct memory access," or DMA. With DMA, a quantity of image data relating to a particular image desired to be printed is retained at a predetermined location in a real or virtual memory, typically within a set of contiguous virtual addresses in the memory. The image data waits at this predetermined location until the precise time-frame when a particular sheet is positioned within the printing hardware for creation of the image thereon. When the particular image is to be created, a "data pipeline" is set up between the particular addresses in the memory holding the desired image data, and the printing hardware. Precisely when needed (based on the position of a sheet relative to the imaging apparatus, such as the ink-jet head or laser beam), the image data is copied or otherwise transferred from the predetermined location in memory to the printing hardware. After the image is created by the printing hardware, the printing apparatus will then locate the data for a next image to be printed, which may be located at another predetermined location within the memory.

With many high-volume (50–130 prints per minute) and mid-volume (25–60 prints per minute) digital printers, "duplexing," which is printing an image on both sides of a sheet is often a desired feature. Because most commercially-available digital printers include only one imaging device, such as a laser and photoreceptor, or ink-jet printhead, a sheet which is desired to be duplex-printed must first receive an image on its first side, and then be essentially re-fed past the imaging device to receive its second-side or "duplex" image. Thus it is common, when speaking of digital printers, to speak of a "duplex path" or "duplex loop," which is the paper path in which a sheet which has already been printed with an image on one side thereof is fed back into the machine for printing on the second side.

One early patent showing duplexing in a digital-printing context is U.S. Pat. No. 4,453,841; this patent shows a duplex loop for digital printing with an ink-jet printhead, but significantly also shows that in a design of a duplex path for sheets with "short-edge feed," the sheet receiving its first-side image is fed past the printhead "head first," that is, with the top of the image printed thereon being first past the printhead. Because of the architecture of the duplex path, however, the same sheet, when it is re-fed past the printhead to receive the second-side image, moves past the printhead "feet first," so that the bottom of an image is first past the printhead. The important point is that, when using certain types of duplex loop architectures, the second-side image must be rotated on the page relative to the first-side image, so that in the finished print, the top of each of the first-side image and the second-side image are both oriented toward the same edge of the sheet.

When using duplex printing in the high-speed environment, and where it is necessary to rotate every image that will be printed on the second side of a sheet, the necessity to rotate every other image being transferred to the printing hardware may represent a significant consumption of time. Rotating the image through manipulation of image data, such as by an extra processing step not required for non-rotated images, may cause intolerable delays in getting the image data to the printing hardware when the particular sheet becomes available. In a high-speed printer, a sheet which already has received its first-side image cannot be readily stalled in a position until the second-side image data becomes available to it. There is therefore a need to provide this 180-degree rotation to image data in real time. U.S. Pat. No. 4,307,958 discloses a printing machine capable of duplex printing, wherein a sheet receives an image on its first side, and then is re-fed past the imaging apparatus in a reverse direction to receive the second-side image. In this case, with both passes of the sheet past the imaging apparatus, the feed of the sheet is always "head first." Nonetheless, a controller must regulate the imaging apparatus to ensure that the image recorded on each side of the sheet reads from left to right.

SUMMARY OF THE INVENTION

According to the present invention, there is provided a method of transferring image data from a memory for application to printing hardware which is selectably capable of printing a regular image on sheet and an rotated image on a sheet, based on image data. There is retained in the memory a quantity of image data representative of an image to be printed, the image data being organized as a plurality of data units, with each data unit corresponding to one address in the memory. The addresses in the memory retaining the image data are organized in a series of addresses having an order associated therewith. Each data unit comprises a plurality of sets of bits of image data, with each set of bits relating to one pixel area in an image to be printed. For a regular image to be printed, a series of data units are transferred from the memory to the printing hardware in a forward order of addresses over time. For an rotated image to be printed, a series of data units are transferred from the memory to the printing hardware in a reverse order of addresses over time. For each transferred data unit in an rotated image to be printed, a relationship of sets of bits within the data unit are altered.

DESCRIPTION OF THE INVENTION

Figure 1:
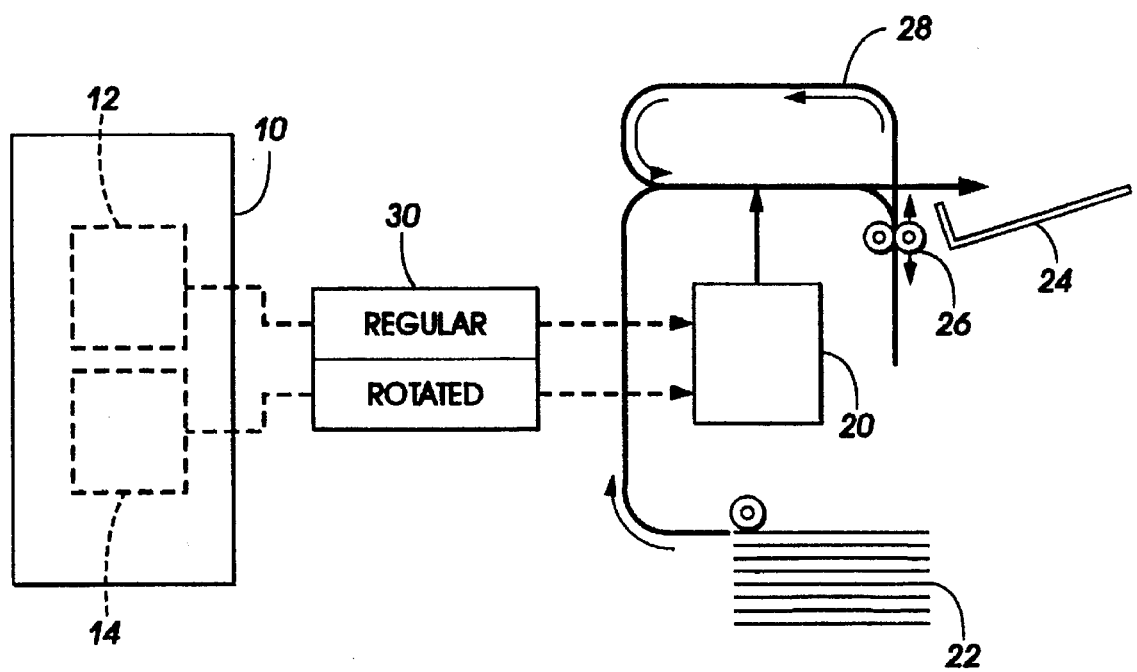
FIG. 1 is a simplified systems diagram illustrating the relationship of a memory retaining image data with an image associated with a duplexing apparatus.

FIG. 1 is a simplified systems diagram showing the flow of image data from a memory 10 ultimately to printing hardware, and in particular to an imaging apparatus or imager indicated as 20. Memory 10 is typically in the form of a virtual memory which is generally capable of being immediately accessed for transference of data therein to an imager such as 20. However, those familiar in the digital printing art will appreciate that the memory generally indicated as 10 may further include additional disk memories (not shown) from which image data may be retrieved as needed and then placed in a random-access memory for imminent direct memory access (DMA) by imager 20. When image data is retained in the memory 10 for DMA at a particular time, it is typical that the specific image data is retained in the memory 10 in an uncompressed form, so that the image data itself can be used, for example, to operate a modulating laser if imager 20 is an electrophotographic printer, or to cause individual ejectors in an ink-jet printhead to eject ink onto a sheet at a particular time.

Quantities of digital data, each quantity representing data for an individual image to be printed on a sheet, are retained in memory 10 at specific predetermined locations for eventual DMA. As will be appreciated by one of skill in the art, any number of additional hardware and software constructs are required so that a particular desired set of data may be located in real and/or virtual memory when it is needed to create the image. Preferably, the image data for each individual page image is retained at a set of contiguous addresses within real or virtual memory, and further is retained in a particular order, so that when the image data is transferred from the memory 10, the downloading of the image data will be coordinated with the operation of the imager 20 over time, so that a coherent image based on the image data is created on the sheet.

Imager 20 (which may be an electrophotographic print engine including a laser, or an ink-jet printhead, or some other apparatus for creating marks on a sheet) operates in conjunction with a paper-feed apparatus which draws sheets from a stack of sheets, such as indicated as 22. As shown in FIG. 1, an individual sheet drawn from a stack 22 is almost immediately caused to move past imager 20 to receive an image thereon. In the case of simplex printing, a sheet drawn from stack 22 is imaged by imager 20 and then essentially immediately deposited in a catch tray such as 24. However, if it is desired to create two duplex images, on the front and back of a sheet drawn from stack 22, a slightly more complicated paper path is required. As shown in FIG. 1, a sheet drawn from stack 22 receives its first-side image from imager 20 in exactly the same manner as a simplex, or one-sided, print. However, after receiving the first-side image, the sheet is entered in what is here generally called a "reverser" 26, and then caused to circulate through a duplex path 28, where the second-side thereof is made available to imager 20 to create an image thereon.

As is generally known in the art, the function of reverser 26 is to turn the sheet over: the sheet enters the reverser 26 in a first direction and then the paper path is immediately reversed. Thus, if the sheet entered the reverser 26 head-first, it will be pushed out of the reverser 26 feet first. So, while the sheet on duplex path 28 is inverted in a front-back sense, the action of the reverser 26 also inverts the sheet in a head-to-foot sense. After receiving the second-side image the completed duplex sheet is caught in catch tray 24. A fuller explanation of the operation of a duplex path such as shown herein is given in U.S. Pat. No. 5,504,568 assigned to the assignee hereof, and incorporated herein by reference.

Because the sheet moves past the imager 20 head-first when receiving the first-side image and moves past the imager 20 feet-first when receiving its second-side image, it is necessary that the first- and second-side images be rotated relative to each other so that, in the finished print, the top of each image is oriented to the same edge of the paper so that, for example, the sheet can be stapled into a book. As mentioned above, the step of rotating all second-side images may be an undesirable consumer of time in a high-speed, real-time printing context. According to the present invention, there is provided a technique whereby the inversion of particular images can be performed integral with the step of the direct memory access (DMA) of the image data from memory 10.

As shown in FIG. 1, a print controller generally indicated as 30 is effectively interposed between the memory 10 and the imager 20. This controller is a combined hardware and software entity which is here simplified for explaining the present invention, and in the real world would further include any number of sophisticated control systems which would be apparent to one of skill in the art. If, within memory 10, there is located one set of addresses indicated as 12 holding image data for a first-side image to be printed, and a second set of contiguous addresses, indicated as 14, which holds data representative of the second-side image on the same sheet, it will be apparent that the first-side image represented by data 12 can pass through controller 30 without being rotated, because the sheet receiving the image from imager 20 will be moving past imager 20 head-first. However, after the sheet goes through reverser 26 and around duplex path 28, the second-side image, represented by data 14, must be rotated before it is sent to imager 20. The method of the present invention proposes a technique whereby this inversion of the data at addresses 14 can be accomplished integral with the direct memory access of the data at addresses 14 by controller 30.

In the following example, it is assumed that data in area 14 accessed via controller 30 and made available to imager 20 is copies or otherwise transferred from addresses 14 one byte at a time: that is, in real time, the image data at addresses 14 will pass to imager 20 as a series of bytes. As each byte comprises 8 bits, the procession of bytes from addresses 14 to imager 20 could be performed, for example, over an 8-bit parallel bus.

(It will be apparent that, in the present discussion, while the "head-first" and "fleet-first" conventions are basically applied to tops and bottoms of images, it will be apparent that the same principle applies when printing one of multiple images on a side of a sheet in "2-up" or other signature-type fashion; in such a case, one or more of the multiple images may need to be rotated as well.)

Figure 2:
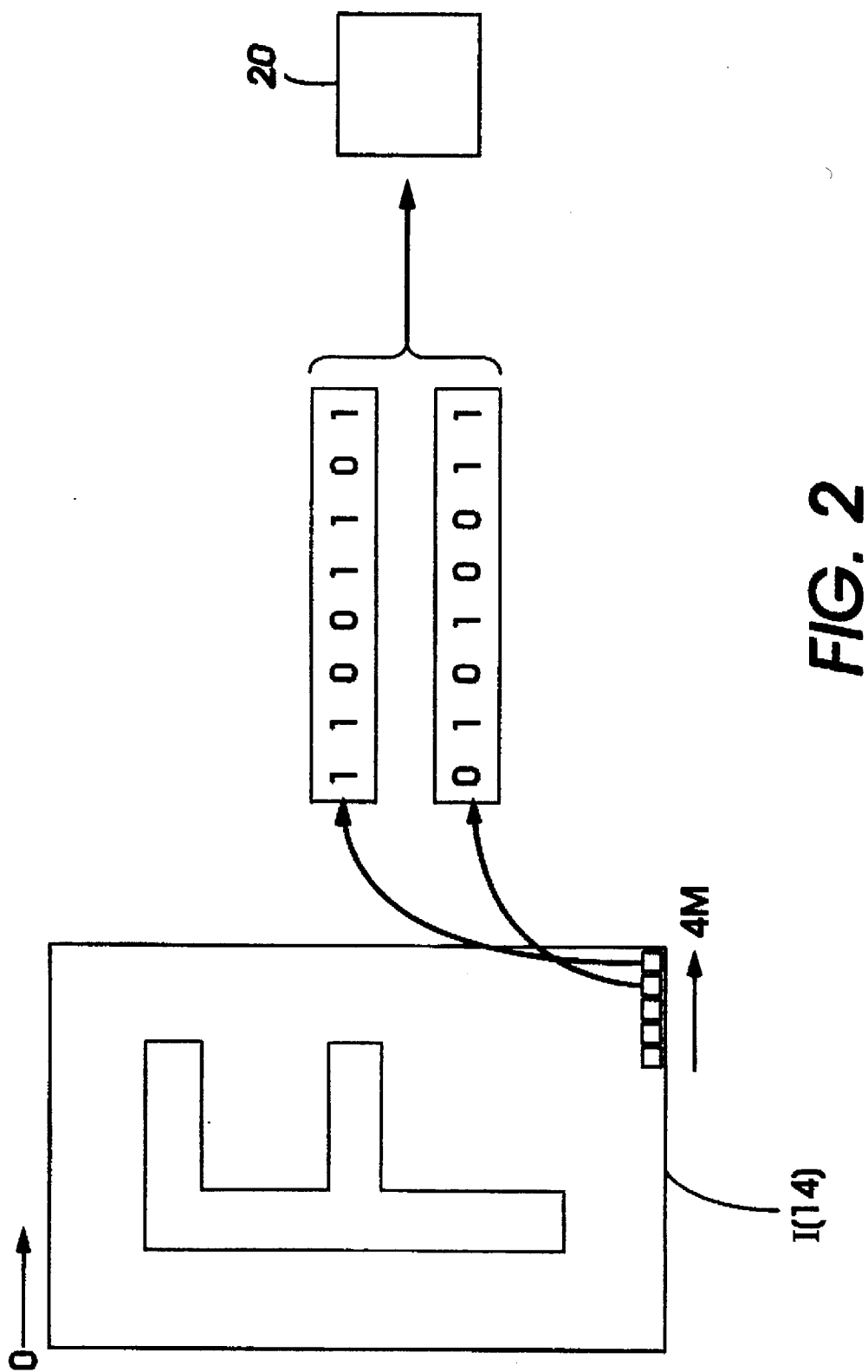
FIG. 2 is a diagram illustrating the relationship of data units within an image to be printed.

FIG. 2 is a diagram showing how an image to be printed, such as indicated as I, and which would be in the form of data located at a series of contiguous addresses in memory 10 such as at location 14, would be sent as a series of 8-bit parallel bytes over time to an imager 20. The image I, which is shown for reference purposes as containing the large capital letter F, can be broken down into a set of data units. As mentioned above, a typical 600 spi letter-sized image typically consists of approximately 4 megabytes of uncompressed image data. Therefore, a contiguous set of addresses such as 14 will typically include 4 million addresses, each address containing one byte of image information. As shown in the example of FIG. 2, the 4 million bytes are retained in a specific order of addresses in memory, and this order corresponds in this case to the arrangement of image data from the top left corner to the bottom right corner of the image I (although, of course, different conventions for the spatial relation of image data within the actual image will be apparent to those of skill in the art). When performing a DMA on the image, individual bytes forming the image are transferred in a specific time sequence from the location 14 in memory 10 to imager 20. This time order will of course directly affect the integrity of the final image formed on the sheet. To take the example first of a regular image transferred to imager 20, the bytes are transferred to imager 20 in a "forward" order, that is, starting with byte 0, corresponding to the top left corner of the image, and then progressing from left to right in a series of lines down to the bottom right corner, where is located the four millionth byte. This forward order would, in this example, be satisfactory in printing a head-to-foot image. However, for a second-side image, wherein the image must be created foot-to-head, it is necessary to start with the 4 millionth byte, corresponding to the bottom right corner and then work in reverse order down to byte 0 corresponding to the top left corner.

According to the present invention, when it is desired to print a rotated image, so the time sequence of transferring bytes from locations 14 to imager 20 is performed in this reverse order. If the bytes retaining the image data are in the form of contiguous virtual or real addresses at location 14, according to the DMA method the bytes are read to imager 20 in a reverse order, i.e., an order reverse of the forward order that would be used for a non-rotated image. Significantly, with any kind of DMA, the order of addresses in memory 10, whether read forward or backward, are necessary for organizing the image. The "pipeline" set up by the DMA involves accessing the data at contiguous addresses within location 14 and transferring the data over time to imager 20 through the order, forward or backward, of the addresses.

A slight complication occurs in situations where the data units by which images are transferred to imager 20, which are in this case 8-bit bytes, are reversed in order. In the case of monochrome printing, where typically each bit in the data corresponds to exactly one pixel, while the order of bytes (that is, groups of 8) bits are reversed for the rotated image, it will still be necessary to rotate the order of pixels (sets of bits) within each byte. As shown in FIG. 2, this four millionth byte is shown as having the individual bit 11001101, while byte 3,999,999 has for the present example, a value of 01010011, and so forth down to 0. In this case, if a particular byte being transferred has a value of 11001101 when it is stored at location 14, the reversal of all of the bits would require that the reversed byte, 10110011, be submitted to imager 20.

Figure 3:
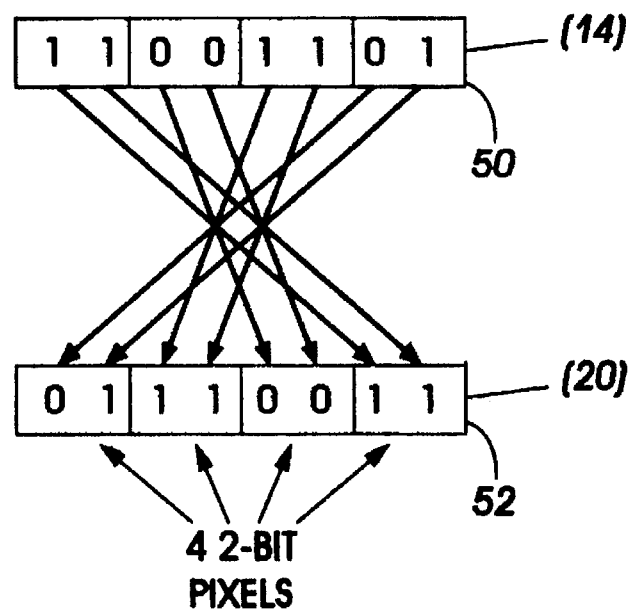
FIGS. 3 and 4 are diagrams illustrating the principle of altering the relationship of sets of bits within each data unit, and also how this altering can be carried out by means of a hard-wiring arrangement.
Figure 4:
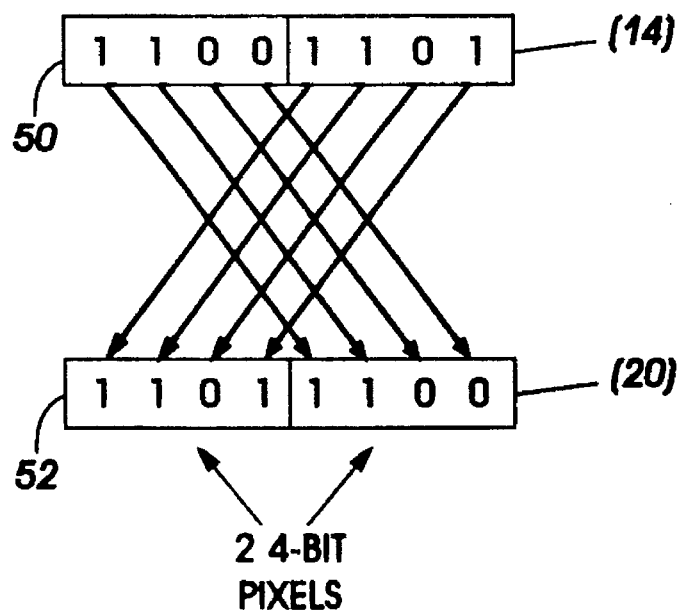

In some printing systems, each data unit transferred to imager 20 consists of sets of bits, with each set of bits in each data unit corresponding to one individual pixel. For example, in a highlight color printing apparatus, each pixel requires two bits, as opposed to the one-bit-per-pixel arrangement of monochrome printing. If the data is transferred from locations 14 one byte at a time, each byte will include eight bits, which represent only four pixels. It is important, in this case, to reverse the order of pixels within each byte being transferred; but within each two bits corresponding to each pixel, the order of the bits within each pixel must be maintained. Thus, in a two-bit-per-pixel highlight-color arrangement, each data unit, which in this case is bytes, must have its order of bits reversed, with each pair of bits corresponding to an individual pixel retaining its original order. Thus, for an original byte stored in memory as 11001101, each of the four pairs of bits in the group reverse order, but the bits retain their order within each pair, yielding 01110011. A clearer illustration of this concept is shown in FIG. 3, wherein the bits of a particular byte as retained in location 14 are retained as pairs, but the pairs reverse order when the data is submitted to imager 20. To take another example, FIG. 4 shows the reversal of sets of bits when there are two 4-bit pixels per byte: the order of each of the two sets of bits are reversed within the byte, but within each set of bits, the order of the four bits is retained.

According to a preferred embodiment of the present invention, while the reading of data units from a sequence of addresses in memory 10 is accomplished by software means in the DMA, the step of rotating sets of bits within each data unit is performed by a hard-wiring arrangement. Turning, for example, to FIGS. 3 and 4, if the illustrated blocks of bits such as 14 and 20 are each considered as a cross-section of a parallel bus, with each bit corresponding to one wire in the bus, the parallel bus 50 emerging from memory location 14 can be connected to the parallel is bus 52 associated with imager 20 by means of a cross-wiring arrangement indicated as 54. In the FIG. 3 example, the cross-wiring arrangement 54 carries out the 2-bit inversion, while in FIG. 4, the cross-wiring arrangement 54' carries out the 4-bit inversion. Use of the hard-wiring arrangement for the intra-byte inversion consumes no apparent time when performing a DMA.

The advantage of the system of the present invention is that rotating of individual images as needed is carried out by a combination of reading out data from addresses in a reverse order, and altering the order of sets of bits within each byte by a hard-wiring arrangement, which consumes no additional time. The combination of reverse DMA and hardware-bit intra-byte reordering enables an inversion of selected images with no overhead added to the data-retrieval system.

While the invention has been described with reference to the structure disclosed, it is not confined to the details set forth, but is intended to cover such modifications or changes as may come within the scope of the following claims.

We claim:

1. A method of transferring image data from a memory for application to printing hardware, the printing hardware being selectably capable of printing a regular image on a sheet based on image data, comprising the steps of:

retaining in the memory a quantity of image data representative of an image to be printed, the image data being organized as a plurality of data units, each data unit corresponding to one address in the memory, addresses in the memory retaining the image data having an order associated therewith, each data unit comprising a plurality of sets of bits of image data, each set of bits relating to one pixel area in an image to be printed;

for a regular image to be printed, transferring a series of data units from the memory to the printing hardware in a forward order of addresses over time;

for a rotated image to be printed, transferring a series of data units from the memory to the printing hardware in a reverse order of addresses over time; and for each transferred data unit in a rotated image to be printed, altering a relationship of sets of bits within the data unit, the altering step including the step of providing a hard-wiring arrangement operatively interposed between the memory and the printing hardware, the arrangement performing the altering step on a data unit passing therethrough.

2. The method of claim 1, wherein, for each data unit, each set of bits comprises a plurality of bits, and wherein the altering step includes reversing a relative order of sets of bits within the data unit, but retaining an original relative order of bits within each set of bits.

* * * * *